US008477174B2

(12) United States Patent
Michaelis (10) Patent No.: US 8,477,174 B2
(45) Date of Patent: Jul. 2, 2013

(54) AUTOMATIC VIDEO SWITCHING FOR MULTIMEDIA CONFERENCING

(75) Inventor: Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 1089 days.

(21) Appl. No.: 12/394,292

(22) Filed: Feb. 27, 2009

(65) Prior Publication Data
US 2010/0220172 A1    Sep. 2, 2010

(51) Int. Cl.
*H04N 7/14*    (2006.01)
(52) U.S. Cl.
USPC ............. 348/14.08; 348/14.09; 348/14.1; 348/14.11; 348/14.12
(58) Field of Classification Search
USPC ......... 379/202.01–207.01; 709/204; 455/416; 348/14.8, 14.9, 14.1, 14.11, 14.12
See application file for complete search history.

(56) References Cited

U.S. PATENT DOCUMENTS

| 5,206,721 | A | * | 4/1993 | Ashida et al. | 348/14.1 |
| 5,745,161 | A | * | 4/1998 | Ito | 348/14.09 |
| 7,028,269 | B1 | | 4/2006 | Cohen-Solal et al. | |
| 7,559,026 | B2 | * | 7/2009 | Girish et al. | 715/716 |
| 8,081,205 | B2 | * | 12/2011 | Baird et al. | 348/14.08 |
| 2002/0101505 | A1 | | 8/2002 | Gutta et al. | |
| 2004/0257432 | A1 | * | 12/2004 | Girish et al. | 348/14.08 |
| 2008/0165245 | A1 | * | 7/2008 | Sarkar et al. | 348/14.09 |
| 2008/0218582 | A1 | * | 9/2008 | Buckler | 348/14.08 |
| 2010/0157016 | A1 | * | 6/2010 | Sylvain | 348/14.08 |

OTHER PUBLICATIONS

Oliver Jesorsky, 3SOFT-Standardizing the Embedded World, Mar. 5, 2006, Germany.

* cited by examiner

*Primary Examiner* — Joseph J Nguyen
(74) *Attorney, Agent, or Firm* — Sheridan Ross P.C.

(57) ABSTRACT

After a video conference is established, a video conferencing system receives a video stream from the participants of the video conference. One of the received video streams is transmitted to the conference participants (e.g. the video stream of the person currently speaking). The video conferencing system monitors a second one (or typically all) of the received video streams to determine if a designated video event (e.g. someone raising his hand) has occurred. If the designated video event has occurred, the video conferencing system switches or supplements the currently transmitted video stream to or with the second one of the received video streams that contains the designated video event. The second video stream is then transmitted to participants in the video conference. The switching of the video stream and the switching of the audio stream may be independent.

22 Claims, 5 Drawing Sheets

AUTOMATIC VIDEO SWITCHING FOR MULTIMEDIA CONFERENCING

TECHNICAL FIELD

The system and method relates to video conferencing systems and in particular to managing video conferencing streams.

BACKGROUND

Currently, there are various video conferencing systems that can conference multiple video streams. Users can call into the video conference and see and hear the other attendees of the video conference. The endpoints that support this type of conferencing include, at a minimum, a microphone, a speaker, a video camera, and a video display. Although some systems permit conference participants to view all attendees simultaneously, a typical multi-point video conferencing system will broadcast to all participants the image of the individual who is presumed to be the current person-of-interest. Current systems that identify the person-of-interest automatically generally do so by analyzing the audio signal. The underlying assumption is that the video image that is transmitted to the conference participants should be that of the person who is speaking. The simpler systems that behave in this manner will switch the video signal based on which endpoint is contributing the strongest audio signal. More advanced systems can distinguish between someone speaking words versus non-verbal sounds such as coughs or background noise. The problem with current systems is that they do not take into account other video events when determining what video feeds to display to the attendees of the video conference. For example, while someone is speaking, another participant may raise his hand or shake his head in response to what is being said, but the system will continue focusing on the person who is currently speaking. There is no mechanism to integrate displaying participants into the conference by focusing on these non-verbal cues of participants in the video conference. For this reason, current systems fail to provide the "full duplex" person-to-person communication experience that can make a face-to-face meeting so much more satisfying than a teleconference.

SUMMARY

The system and method are directed to solving these and other problems and disadvantages of the prior art. After a video conference is established, a video conferencing system receives a video stream from the participants of the video conference. One of the received video streams is transmitted to the conference participants (e.g. the video stream of the person currently speaking). The video conferencing system monitors a second one (or typically all) of the received video streams to determine if a designated video event (e.g. someone raising his hand) has occurred. If the designated video event has occurred, the video conferencing system switches or supplements the currently transmitted video stream to or with the second one of the received video streams that contains the designated video event. The second video stream is then transmitted to participants in the video conference. The switching of the video stream and the switching of the audio stream may be independent; for example, the audio stream may be that of Person A speaking while the video stream is that of Person B shaking his head. In addition, the video conferencing system can work in conjunction with audio events (e.g. someone speaking) to provide an enriched video conference experience for participants in the video conference.

BRIEF DESCRIPTION OF THE DRAWING

These and other features and advantages of the system and method will become more apparent from considering the following description of an illustrative embodiment of the system and method together with the drawing, in which.

DETAILED DESCRIPTION

Figure 1:
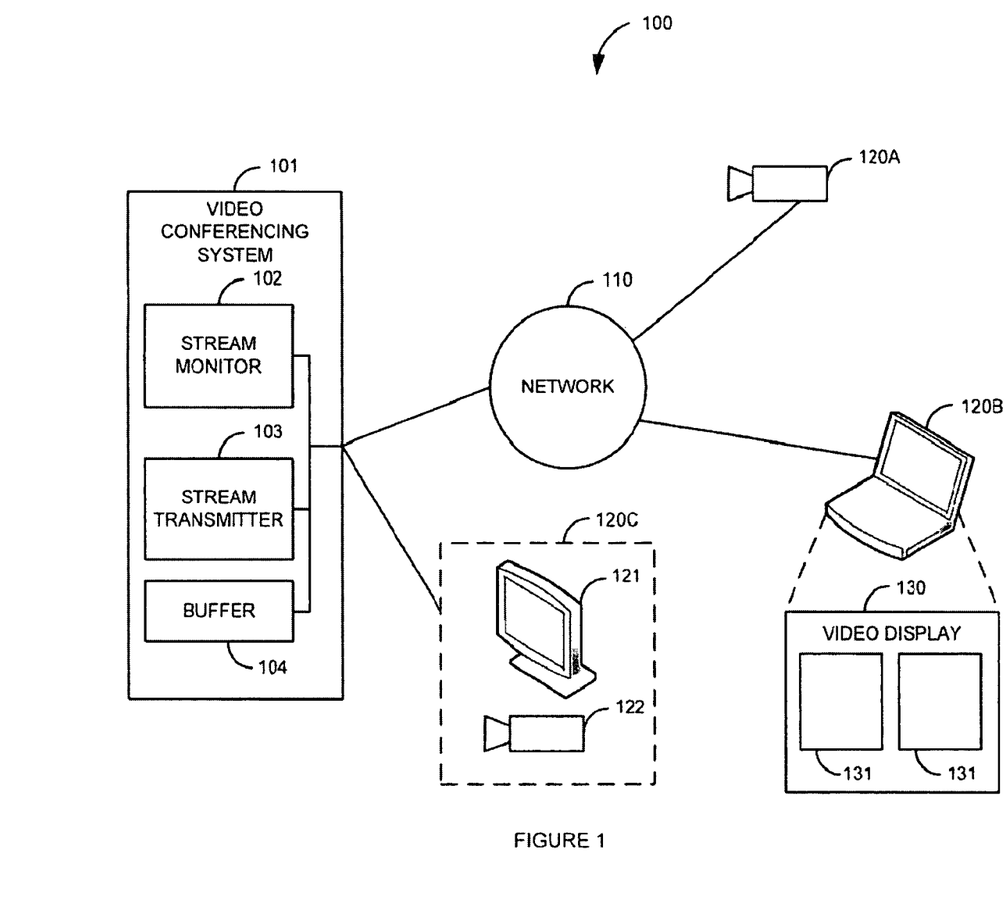
FIG. 1 is a block diagram of a first illustrative system for changing transmission of a video stream based on video event(s).

FIG. 1 is a block diagram of a first illustrative system 100 for changing transmission of a video stream based on video event(s). The first illustrative system 100 comprises a video conferencing system 101, a network 110, and communication devices 120. The network 110 can be any type of network that supports the transmission of video streams such as the Internet, a packet switched network, a Time Division Network (TDM), a Local Area Network (LAN), a Wide Area Network (WAN), and the like. A video stream can be any video stream such as an analog video signal, a digital video signal, a packet stream, a non-packet stream, and the like. The communication devices 120 can be any device capable of sending and/or receiving a video signal such as a video camera 120A, a Personal Computer (PC) 120B, a combination 120C of a video receiver/display 121 and a camera 122, a video phone, a television screen, and the like. The communication devices 120 can be connected to the video conferencing system 101 through the network 110 or the communication devices 120 can be directly connected to the video conferencing system 101.

The video conferencing system 101 comprises a stream monitor 102, a stream transmitter 103, and a buffer 104. The stream monitor 102 can be any device or system capable of receiving and monitoring a video stream such as a PC, a router, a Private Branch Exchange (PBX), a video server, and the like. The stream transmitter 103 can be any device or system that can transmit a video signal such as a PC, a router, a PBX, a video server, and the like. The buffer 104 can be anything that is capable of storing a video stream such as a memory, a random access memory, a disk, and the like.

The communication device 120 has a display screen 130 that shows video streams of the video conference. Within the display can be windows 131 of multiple video streams in the video conference.

The stream monitor 102 sets up a video conference of a plurality of video streams that are sent from the communication devices 120. The stream monitor 102 receives the plurality of video streams from the communication devices 120 that comprise the video conference. The video streams from the communication devices 120 typically show the participants who are in the video conference at the location of the communication device 120. The video camera 122 in the communication device 120 can be panned to focus on various speakers and participants in the video conference or there can be multiple video cameras 122/communication devices 120 at a single location/room. The stream transmitter 103 transmits a first one of the received video streams to the communication devices 120 (typically the video stream of the current speaker). Each of the communication devices 120 can then display the video stream on the display screen 130. In a preferred embodiment, there will only be one video stream displayed by the display screen 130. However, in some embodiments, the video stream transmitted by the stream transmitter 103 may contain multiple windows 131 of different video streams.

The stream monitor 102 monitors a second stream (but typically all) of the plurality of video streams sent from the communication devices 120 for a video event. A video event could be a specific movement/gesture by a participant in the video conference, such as the raising of a hand, waving, shaking a head, nodding, and the like. It can also be a facial gesture, such as a smile or frown. A video event could be a combination of video events such as a person shaking his head and raising his hand. Recognition of gestures in video streams is accomplished using known techniques such as those disclosed in U.S. Patent Application Publication 2002/0101505, which is incorporated herein by reference. In this context, it is important to note that it is possible to distinguish between video events that are of value to the conference—e.g., someone raising his hand—and events that are not of value, such as someone sneezing or combing his hair.

The stream monitor 102 buffers the monitored video stream(s) in the buffer 104. The buffer 104 is used to store detected video events, so a whole video event can be transmitted to the communication devices 120.

Once it is determined that the designated video event in the second video steam has occurred, the stream monitor 102 switches the transmission of the first video stream to a transmission of the second video stream. The stream transmitter 103 transmits the second video stream to the communication devices 120 in place of the first video stream. The communication device 120 then displays the second video stream. Alternatively, the stream transmitter 103 supplements the first stream with the second stream and causes them to be displayed in respective display screen 130 and window 131.

Figure 2:
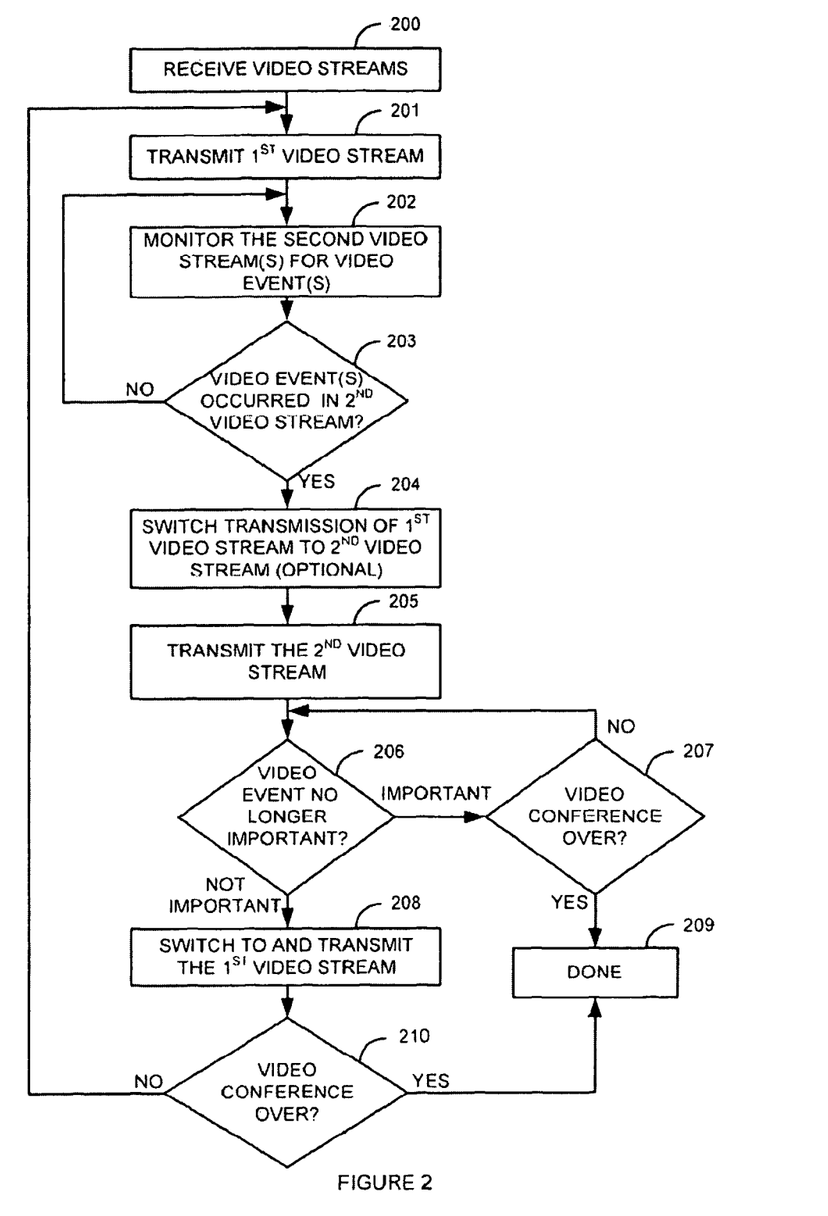
FIG. 2 is a flow diagram of a method for changing transmission of a video stream based on video event(s).

FIG. 2 is a flow diagram of a method for changing transmission of a video stream based on video event(s). Illustratively, the stream monitor 102, the stream transmitter 103, the buffer 104, and the communication devices 120 are stored-program-controlled entities, such as a computer, which performs the method of FIGS. 2-5 by executing a program stored in a storage medium, such as a memory or disk.

After a video conference is set up, the stream monitor 102 receives 200 a plurality of video streams that comprise a video conference from the communication devices 120. The plurality of video streams could be coming from different locations or could be from different video cameras 122 at the same location/room. A first video stream of the plurality of video streams is transmitted 201 by the stream transmitter 103 to the communication devices 120. The first video stream is typically a stream of the current person talking in the video conference. The stream monitor 102 monitors 202 a second video stream (or typically all video streams in the video conference) to determine if a designated video event(s) in the second video stream (or any of the video streams) has occurred. If the video event(s) did not occur in step 203, the stream monitor 102 continues to monitor 202 the second video stream(s) for the video event(s).

Otherwise, if the video event(s) occurred in the second video stream in step 203, the stream monitor 102 optionally switches 204 from the transmission of the first video stream to a transmission of the second video stream. If the video event occurred in a plurality of the second video streams, either all of them or a representative one may be transmitted and displayed. The stream transmitter 103 transmits 205 the second video stream to the communication devices 120. Typically the transmission will be to all communication devices 120 that are capable of displaying the video conference. The stream monitor 102 monitors 206 the second video stream to determine if the second video stream's designated video event(s) are no longer important. A video event may be no longer important in various ways. For example, the person who raised his hand is no longer doing so. The person who was waving is no longer doing so. The person who was nodding is no longer doing so. The stream monitor 102 can monitor 206 for various video events at the same time. The stream monitor 102 can use hysteresis when determining if the designated video event is no longer important in step 206.

If the video event(s) are still important in step 206, the stream monitor 102 checks 207 if the video conference is over. If the video conference is not over in step 207, the process monitors 206 the second video stream to determine if the second video stream's video event(s) are no longer important. Otherwise if the video conference is over in step 207, the process is done 209.

If the video event is no longer important in step 206, the stream monitor 102 switches 208 to the first video stream from the second video stream and the stream transmitter 103 transmits the first video stream to the communication devices 120. The stream monitor 102 determines 210 if the video conference is over. If the video conference is over in step 210, the process is done 209. Otherwise, if the video conference is not over in step 210, the process goes back to step 201.

Figure 3:
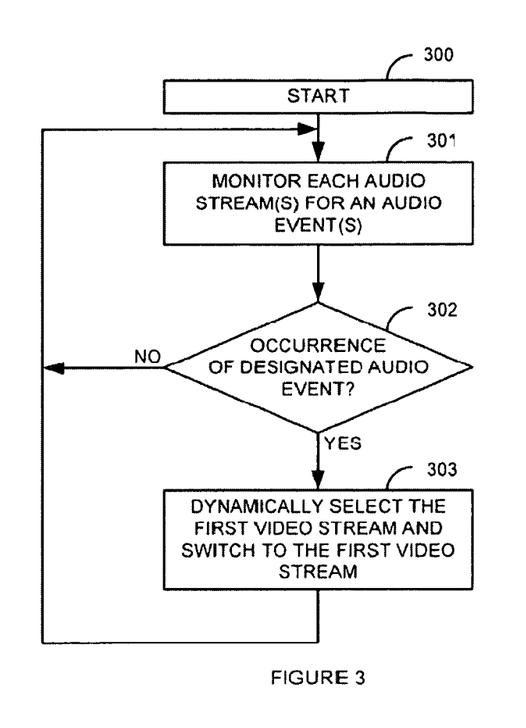
FIG. 3 is a flow diagram of a method for monitoring audio streams to dynamically select a video stream.

FIG. 3 is a flow diagram of a method for monitoring audio streams to dynamically select a video stream. Typically a video stream will comprise an audio stream that is associated with the video stream. The process starts 300 when the stream monitor 102 monitors 301 the associated audio streams of the plurality of video streams for an audio event(s). An audio event may be used to identify which video stream contains the audio of the current speaker in the video conference. This may be done using sound levels, or other mechanism that can identify speech versus noise and other things like coughing. The audio event may be a specific word or phrase in an audio stream. If the designated audio event was not found in one of the audio streams in step 302, the process goes back to step 301. Otherwise, if the designated audio event was found in one of the audio streams, the stream monitor 102 dynamically selects 303 the one video stream and switches to the one video stream. The stream monitor 102 then monitors 301 each audio stream(s) for an audio event.

The process of FIG. 3 may be implemented as a software thread that is constantly running. For example, assume that the audio event is to identify the current speaker in the video conference. As the stream monitor 103 monitors 301 the audio streams and determines 302 that a designated audio event was found (identifying the current speaker), the video stream associated with the audio stream is dynamically selected 303 as the video stream to be displayed. If a second speaker associated with a different audio/video stream becomes the current speaker, the stream monitor 102 monitors 301 the audio streams and determines 302 that the designated event (identifying the current speaker) was found in a different audio stream. The stream monitor dynamically selects the different video stream associated with the second speaker who is the current speaker in the video conference.

Figure 4:
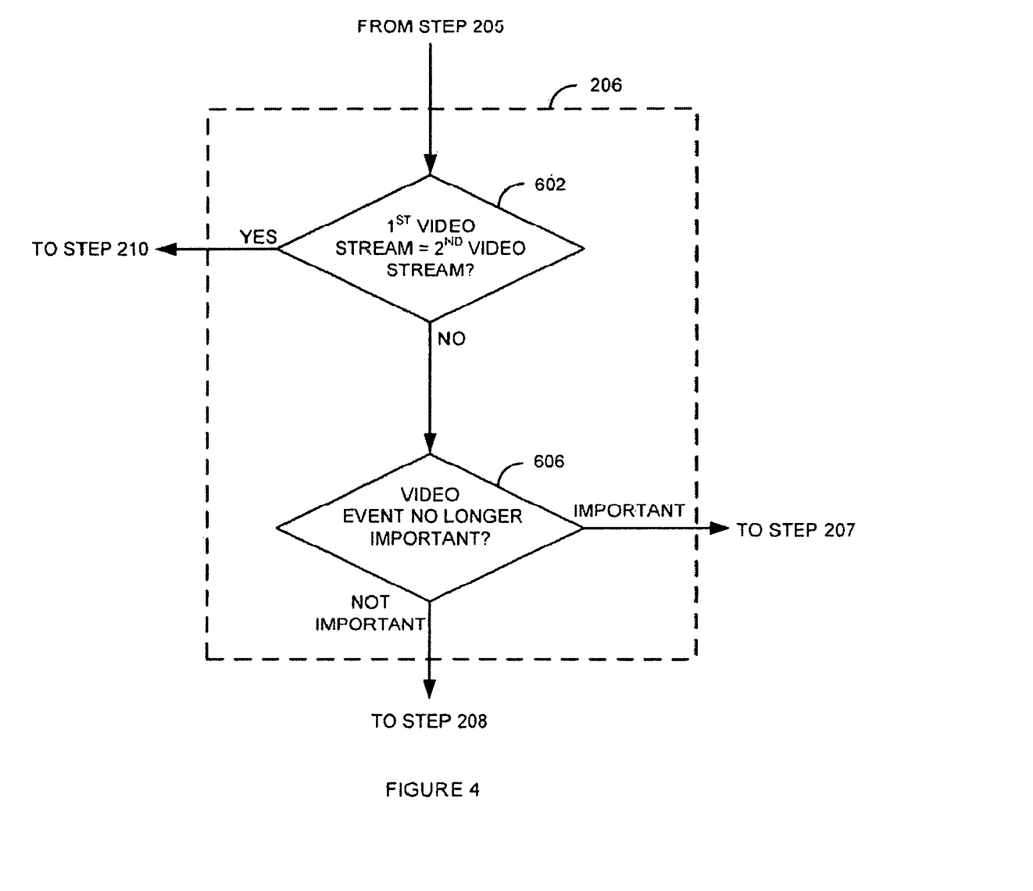
FIG. 4 is a flow diagram of a method for determining if a dynamically selected stream is the same stream that contains a video event.

FIG. 4 is a flow diagram of a method for determining if a dynamically selected stream is the same stream that contains a video event. The method of FIG. 4 is used in conjunction with the methods of FIGS. 2 and 3. FIG. 4 is a flow diagram of step 206 in FIG. 2. After transmitting 205 the second video stream, the stream monitor 102 determines 602 if the first video stream is the same video stream as the second video stream. The first video stream can be the same video stream as the second video stream because the first video stream is dynamically selected 303 and can change as different audio events are determined 302.

If the first video stream is the same video stream as the second video stream in step 602, the process goes to step 210. Otherwise, if the first video stream is not the same video stream as the second video stream, the stream monitor 102 monitors 606 the second video stream to determine if the second video stream's designated video event is no longer important. If the designated video event is important in step 606, the process goes to step 207. Otherwise, if the video event is no longer important in step 606, the process goes to step 208.

Consider the following example using the methods of FIGS. 2-4. Assume that communication devices 120A, 120B, and 120C are all parts of a video conference and send video streams to the video stream monitor 102. The video stream monitor 102 receives 200 the video streams from the communication devices 120. Communication device 120B is at a remote location. Communication device 120A and the camera 122 in communication device 120C are used to provide two video streams of a classroom. Communication device 120A provides a video stream of students in the class and video camera 122 in communication device 120C provides a video stream of a professor speaking to the class. The audio event is to identify the current speaker. The video events are when a student raises his hand and/or shakes his head.

The stream transmitter 103 transmits 201 the first video stream from communication device 120A (the video stream of the class). The professor starts speaking. The stream monitor 102, after monitoring 301 the audio streams, determines that the designated audio event in step 302 has occurred (professor is now the current speaker). The video stream (of the professor) from the camera 122 within communication device 120C now becomes the dynamically selected 303 first video stream. The video stream of the professor is transmitted 201 to communication device 120B. The video stream of the professor is received at communication device 120B and is displayed on the video display screen 130 in communication device 120B.

A student in the class room raises his hand. The stream monitor 102 determines 203 that the video event (someone raising his hand) has occurred in video stream of the class. The stream monitor has buffered the event of the person raising his hand in the buffer 104. The stream monitor 102 switches 204 the transmission of the video stream of the professor to the video stream of the class. The stream transmitter transmits 205 the video stream of the class to communication device 120B along with the mixed audio stream of the video conference. Communication device 120B displays the video stream of the class in the display screen 130; the user at communication device 120B sees the student raise their hand while the professor is talking.

The student who raised his hand starts speaking and lowers his hand. The stream monitor 102 determines 302 that a designated audio event (different current speaker in different stream) has occurred. The video stream of the class is dynamically selected 303 to be the first video stream. The stream monitor 102 determines 602 that the first video stream (video stream of the class) is now the same video stream as the second video stream. Instead of changing the video stream (because the first video stream and the second video stream are now the same), the process goes to step 210. The users continue to see the student talking.

The student asks a question. The professor starts to answer. The stream monitor 102 determines 302 that a designated audio event was found (new current speaker). The stream monitor dynamically selects 303 the video stream of the professor as the first video stream and switches to the video stream of the professor. The video stream of the professor is now streamed to communication device 120B.

A student is now frowning while the professor is speaking. The stream monitor 102 determines 203 that a video event has occurred in the class room video stream. The stream monitor 102 switches 204 the transmission of the first video stream (the professor) to the class room video stream showing the student's non-verbal reaction. The class room video feed is transmitted to communication device 120B. The professor observes the student's reaction and adjusts the manner in which he explains the material. The student stops frowning, then smiles and nods. The video event (the student's non-verbal feedback to the professor) is no longer important in step 206. The stream monitor 102 switches 208 the second video stream (the class room) to the dynamically selected first video stream (the professor) and the stream transmitter 103 transmits the first video stream of the professor to the communication device 120B.

Figure 5:
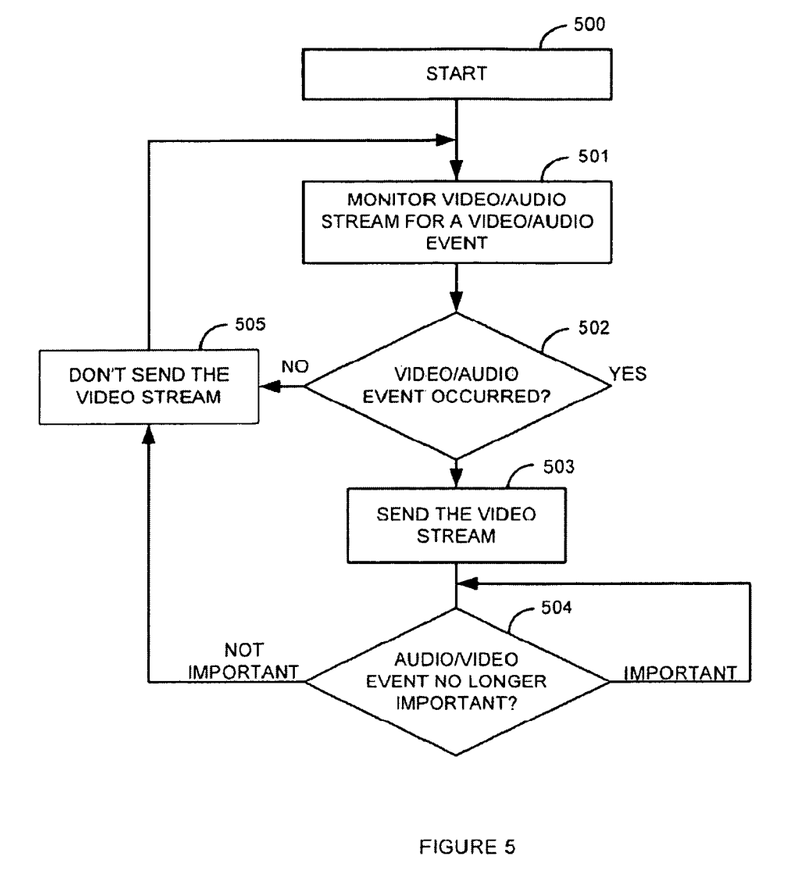
FIG. 5 is a flow diagram of a method for monitoring a video stream for a video event in a communication device.

FIG. 5 is a flow diagram of a method for monitoring a video stream for a video event in a communication device 120. The process starts 500. The communication device 120 monitors 501 a video/audio stream for a video/audio event that is received by the video camera 122. The communication device 120 determines 502 that the video/audio event has occurred in the video/audio stream from the video camera 122. If no video/audio event is detected in step 502, the communication device 120 does not send 505 the video stream to the stream monitor 102 and the process goes to step 501.

Otherwise, if the video/audio event has occurred in step 502, the communication device sends 503 the video/audio stream with the video event to the video monitor 102. The communication device 120 determines 504 if the video/audio event is no longer important. If the video/audio event is still important in step 504, the process repeats step 504 until the video/audio event that was detected in step 502 is no longer important. If the video/audio event is no longer important in step 504, the process stops sending 505 the video stream to the stream monitor 102 and the process goes to step 501.

Of course, various changes and modifications to the illustrative embodiment described above will be apparent to those skilled in the art. For example, consistent with the disability-related requirements and objectives in the Code of Federal Regulations, 36 CFR Part 1193 and 36 CFR Part 1194, a system of the type described in this application could facilitate a teleconference among individuals who use sign language because they are deaf or hearing-impaired. These changes and modifications can be made without departing from the spirit and the scope of the system and method and without diminishing its attendant advantages. It is therefore intended that such changes and modifications be covered by the following claims except insofar as limited by the prior art.

What is claimed is:

1. A system for changing transmission of a video stream comprising:

a stream monitor configured to receive a plurality of video streams that comprise a video conference including a first and a second video stream, and monitor the second video stream to determine whether a designated video event has occurred in the second video stream; and a stream transmitter configured to transmit the first video stream, and to transmit the second video stream in response to a determination that the designated video event has occurred in the second video stream, wherein the second video stream is transmitted in place of or simultaneously with the first video stream; and wherein the video stream is dynamically selected for transmission, the plurality of video streams each further comprises an audio stream, and wherein the stream monitor is further configured to monitor each audio stream of the plurality of video streams for a designated audio event, and dynamically select the first video stream for transmission based on detection of the designated audio event.

2. The system of claim 1, wherein the stream monitor is further configured to determine if a dynamically selected video stream is the second video stream, monitor the second video stream to determine if the second video stream's designated video event is no longer important, and responsive to a determination that the dynamically selected video stream is not the second video stream and that the second video stream's designated video event is no longer important, select the first video stream for transmission.

3. The system of claim 1, wherein the stream monitor is further configured to monitor the second video stream to determine if the second video stream's designated video event is no longer important, and the stream transmitter transmits the first video stream in response to a determination that the second video stream's designated video event is no longer important.

4. The system of claim 3, wherein the stream monitor is further configured to use hysteresis to determine if the second video stream's designated event is no longer important.

5. The system of claim 1 wherein a communication device is configured to receive the transmission of the first video stream, receive the transmission of the second video stream, display the received first video stream, and display the received second video stream.

6. The system of claim 1, wherein at least one of the display of the first video stream and the display of the second video stream is a window within a screen displaying the video conference.

7. The system of claim 1, wherein the video event is based on at least one gesture selected from the group comprising: a raising of a hand, a shaking of a head, a shaking motion, a smile, a frown, a sign in a sign language, and a nodding motion.

8. The system of claim 1, wherein at least one of the plurality of video streams is an item selected from the group comprising: an analog video signal, a digital video signal, a packet stream, and a non-packet stream.

9. The system of claim 1, wherein the stream monitor is further configured to buffer the second video stream to capture the video event.

10. The system of claim 1, wherein a communication device is further configured to determine if the video event has occurred, send the video event in one of the plurality of video streams to the stream monitor in response to determining that the video event has occurred, and not send the one of the plurality of video streams in response to determining that the video event has not occurred.

11. The system of claim 1, wherein the stream monitor is further configured to switch the transmission of the first video stream to the transmission of the second stream in response to the determination that the dynamically selected video stream is not the second video stream.

12. A method for changing transmission of a video stream comprising:
receiving, at a stream monitor, a plurality of video streams that comprise a video conference;
transmitting, from a stream transmitter, a first video stream of the plurality of video streams;
monitoring a second video stream of the plurality of video streams to determine if a designated video event has occurred in the second video stream; and
responsive to determining that the designated video event has occurred in the second video stream, transmitting from the stream transmitter, the second video stream, wherein the second video stream is transmitted in place of or simultaneously with the first video stream; and wherein the first video stream is dynamically selected, and wherein the plurality of video streams each further comprise an audio stream, and further comprising the steps of:
monitoring each audio stream of the plurality of video streams for a designated audio event; and
dynamically selecting the first video stream based on an occurrence of the designated audio event.

13. The method of claim 12, further comprising the steps of:
monitoring the second video stream to determine if the second video stream's designated video event is no longer important; and
responsive to the second video stream's designated video event no longer being important, selecting the first video stream for transmission.

14. The method of claim 13, wherein determining if the second video stream's designated event is no longer important is based on hysteresis.

15. The method of claim 12, further comprising the steps of:
receiving the transmission of the first video stream and the transmission of the second video stream; and
displaying the received first video stream and the received second video stream.

16. The method of claim 12, wherein the display of the first video stream or the display of the second video stream is a window within a screen displaying the video conference.

17. The method of claim 12, wherein the video event is based on at least one gesture selected from the group comprising: a raising of a hand, a shaking of a head, a shaking motion, a smile, a frown, a sign in a sign language, and a nodding motion.

18. The method of claim 12, wherein at least one of the plurality of video streams is an item selected from the group comprising: an analog video signal, a digital video signal, a packet stream, and a non-packet stream.

19. The method of claim 12, further comprising the step of: buffering the second video stream to capture the video event.

20. The method of claim 12, further comprising the steps of:
determining in a communication device if the video event has occurred;
responsive to determining that the video event has occurred, sending the video event in a video stream; and
responsive to determining that the video event has not occurred, not sending the video stream.

21. The method of claim 12, further comprising the step of:
switching the transmission of the first video stream to the transmission of the second stream in response to the determination that the dynamically selected video stream is not the second video stream.

22. A means for changing transmission of a video stream comprising:
means for receiving a plurality of video streams that comprise a video conference;
means for transmitting a first video stream of the plurality of video streams;
means for monitoring a second video stream of the plurality of video streams to determine if a designated video event has occurred in the second video stream; and
means responsive to determining that the designated video event has occurred in the second video stream, for transmitting the second video stream, wherein the second video stream is transmitted in place of or simultaneously with the first video stream; and wherein the first video stream is dynamically selected, and wherein the plurality of video streams each further comprise an audio stream, and further comprising the steps of:
monitoring each audio stream of the plurality of video streams for a designated audio event; and
dynamically selecting the first video stream based on an occurrence of the designated audio event.

* * * * *

UNITED STATES PATENT AND TRADEMARK OFFICE
CERTIFICATE OF CORRECTION

PATENT NO. : 8,477,174 B2  Page 1 of 1
APPLICATION NO. : 12/394292
DATED : July 2, 2013
INVENTOR(S) : Paul Roller Michaelis It is certified that error appears in the above-identified patent and that said Letters Patent is hereby corrected as shown below:

In the Claims:

Column 7, line 12, please delete "the" and insert --a--.

Column 7, line 13, please insert --wherein-- between 'transmission,' and 'the'.

Column 7, line 17, please delete "first".

Column 7, line 21, please delete "to determine if a" and insert --when the--.

Column 7, line 22, please insert --to-- between 'stream,' and 'monitor'.

Column 8, line 22, please delete "comprise" and insert --comprises--.

Column 8, line 34, please insert --dynamically-- between 'important,' and 'selecting'.

Column 9, line 21, please delete "comprise" and insert --comprises--.

Signed and Sealed this
Twentieth Day of August, 2013

Teresa Stanek Rea
*Acting Director of the United States Patent and Trademark Office*